United States Patent
McElvain et al.

(10) Patent No.: US 7,547,750 B2
(45) Date of Patent: Jun. 16, 2009

(54) APPARATUS AND METHOD FOR REMOVING POLYMER SOLIDS FROM SLURRY LOOP REACTOR

(75) Inventors: Robert R McElvain, Kingwood, TX (US); John D Hottovy, Humble, TX (US); David H. Burns, Houston, TX (US); Donald W. Verser, Houston, TX (US); Anurag Gupta, Sugarland, TX (US); Ralph W. Romig, Kingwood, TX (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 640 days.

(21) Appl. No.: 11/244,252

(22) Filed: Oct. 5, 2005

(65) Prior Publication Data

US 2007/0078237 A1    Apr. 5, 2007

(51) Int. Cl.
*C08F 2/12* (2006.01)
*B01J 19/18* (2006.01)
*B01J 8/08* (2006.01)

(52) U.S. Cl. .................. 526/64; 526/920; 422/132; 422/232

(58) Field of Classification Search ............ 422/132, 422/232; 526/64, 920
See application file for complete search history.

(56) References Cited

U.S. PATENT DOCUMENTS

| 4,199,546 A | 4/1980 | Kirch |
| 6,858,682 B2 | 2/2005 | Kendrick et al. |
| 6,926,868 B2 | 8/2005 | Kendrick et al. |
| 2003/0012705 A1* | 1/2003 | Hottovy et al. ............... 422/132 |

FOREIGN PATENT DOCUMENTS

| WO | WO 01/05842 | 1/2001 |
| WO | WO 03/039739 | 5/2003 |

OTHER PUBLICATIONS

Search Report, International Application No. PCT/US2006/036431 to Chevron Phillips Chemical Company LP, dated Dec. 28, 2006.

* cited by examiner

*Primary Examiner*—Fred M Teskin

(57) ABSTRACT

An apparatus and method for removing polymer solids from a slurry loop reactor. A discharge conduit having a longitudinal axis and an end section for removing polymer solids from the slurry loop reactor is provided. The discharge conduit is attached to the slurry loop reactor so that the longitudinal axis and at least a portion of an outer wall of the slurry loop reactor form an angle of less than about 90 degrees. The end section includes a first edge and a second edge that extends past at least a portion of an inner wall of the slurry loop reactor into a liquid reactor slurry. Polymer solids contained within the liquid reactor slurry are concentrated on the second edge so that an average polymer solids concentration in the discharge slurry is greater than an average polymer solids concentration of the liquid reactor slurry within the slurry loop reactor.

19 Claims, 1 Drawing Sheet

APPARATUS AND METHOD FOR REMOVING POLYMER SOLIDS FROM SLURRY LOOP REACTOR

TECHNICAL FIELD OF THE INVENTION

The present invention relates to an apparatus and process for withdrawing polymer solids within a slurry from a polyolefin slurry reactor.

BACKGROUND OF THE INVENTION

Olefin polymers, such as polyethylene and polypropylene, can be produced in a closed loop reactor that is generally defined by a conduit in the form of a closed loop. The olefin polymers are typically produced by circulating a monomer, a catalyst, and a diluent in the closed loop reactor, which produces a slurry of particulate polymer solids suspended in a liquid medium, such as the reaction diluent, along with unreacted monomer, comonomer, and catalyst. Examples of such polymerization processes are described in U.S. Pat. Nos. 6,239,235; 5,455,314; 5,565,175; WO 01/05842; 6,420,497; 4,613,484; 6,281,300; 2,825,721; 3,152,872; and 3,293,000, the disclosures of which are incorporated herein by reference in their entireties.

In polyethylene processes, isobutane is typically used as the diluent. In polypropylene processes, typically no external diluent is added, but polymer solids are suspended in unreacted propylene, which performs a similar function in polypropylene processes as the diluent performs in typical polyethylene processes. Components, such as hexane, pentane, propane, or other similar compounds can also be included in the diluent. Unreacted monomer and comonomers can include compounds such as ethylene, propylene, butene, hexene, decene, and the like. The polymer solids are suspended within the diluent and are removed from the slurry loop reactor as a reactor product within a discharge slurry. However, because the polymer solids are suspended within the discharge slurry, diluent is also typically removed from the reactor within the discharge slurry, along with the polymer solids. The polymer solids and the diluent then need to be separated through a series of processing steps downstream of the reactor, with the diluent typically being recycled back to the slurry loop reactor.

The downstream processing of the diluent contributes to the overall cost of the polyolefin production process. Consequently, it is cost-beneficial to minimize the amount of diluent that must be processed downstream of and recycled back to the reactor. To decrease the amount of such diluent, it is desirable to increase the concentration of polymer solids in the discharge slurry being discharged from the reactor without plugging or causing other problems during operation of the slurry loop reactor.

SUMMARY OF THE INVENTION

In one embodiment of the present invention, a slurry loop reactor includes a discharge conduit for removing a discharge slurry from the slurry loop reactor. The discharge conduit has a longitudinal axis and an end section. The end section includes a first edge and a second edge. The second edge extends past at least a portion of the inner wall of the slurry loop reactor into the liquid reactor slurry. The second edge has an inner surface where the polymer solids are concentrated so that the average polymer solids concentration in the discharge slurry is greater than the average polymer solids concentration of the slurry within the reactor.

The discharge conduit is attached to the slurry loop reactor so that the longitudinal axis and at least a portion of an outer wall of the slurry loop reactor form an angle of less than about 90 degrees.

A process for discharging a discharge slurry from a slurry loop reactor is also provided as an embodiment of the present invention. The process includes opening a discharge conduit that provides access to the slurry loop reactor. The discharge conduit has a longitudinal axis and an end section for removing the discharge slurry from the slurry loop reactor. The end section of the discharge conduit includes a-first edge and a second edge. The second edge extends past at least a portion of an inner wall of the slurry loop reactor into a liquid reactor slurry contained within the slurry loop reactor. The polymer solids are concentrated on the second edge of the end section so that an average polymer solids concentration in the discharge slurry is greater than an average polymer solids concentration in the liquid reactor slurry. The discharge slurry is then discharged through the discharge conduit.

BRIEF DESCRIPTION OF THE DRAWINGS

So that the features, advantages and objects of the invention can be understood in more detail, a more particular description of the invention briefly summarized above can be had by reference to the embodiments illustrated in the appended drawings, which form a part of this specification. The drawings illustrate only particular embodiments of the invention and are therefore not to be considered limiting of the invention's scope as it can admit to other equally effective embodiments.

DETAILED DESCRIPTION OF THE INVENTION

Figure 1:
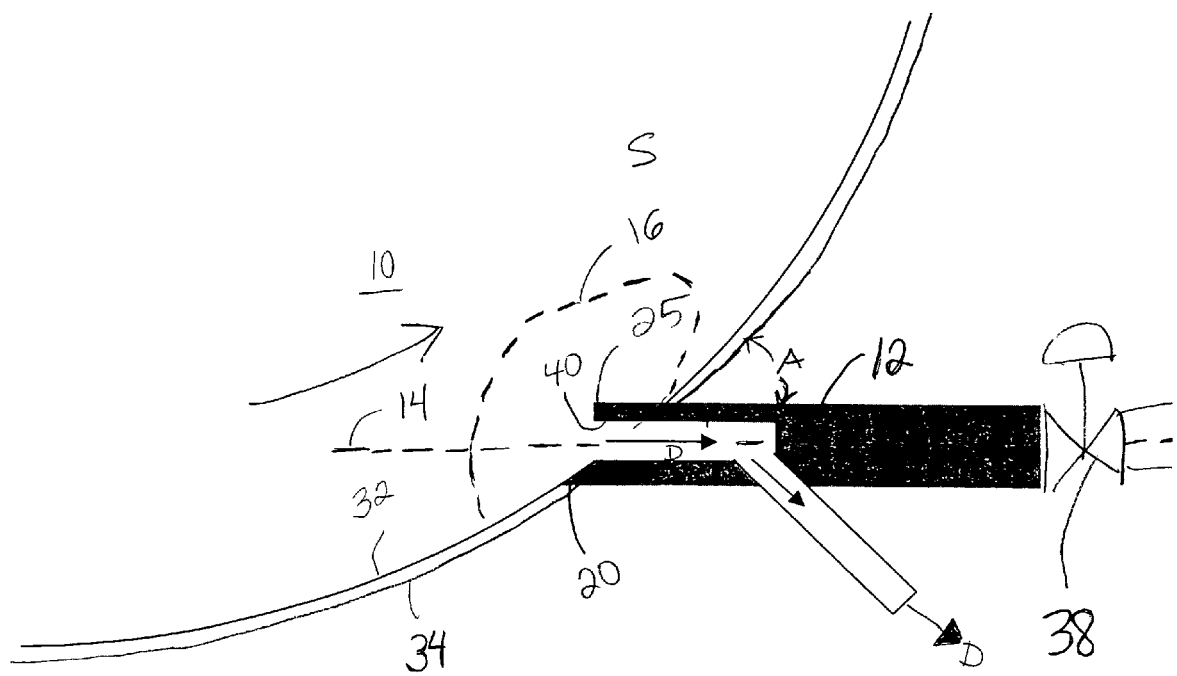
FIG. 1 is a perspective view of a discharge conduit for removing polymer solids from a slurry loop reactor in accordance with an embodiment of the present invention.

As shown in FIG. 1, a slurry loop reactor 10 is provided as an embodiment of the present invention. The slurry loop reactor 10 includes a discharge conduit 12 having a longitudinal axis 14 and an end section 16. The discharge conduit 12 can also be referred to as a take-off. The end section 16 assists with the removal of a discharge slurry D comprising polymer solids, the discharge slurry D being taken from a liquid reactor slurry S contained within the slurry loop reactor 10. The removal of the discharge slurry D can be continuous in some embodiments. Liquid reactor slurry S includes diluent and the polymer solids. The end section 16 includes a first edge 20 and a second edge 25. The first edge 20 is a leading or upstream edge of the end section 16. The second edge 25 is a trailing or downstream edge of the end section 16. In other words, as it circulates through the slurry loop reactor 10, the liquid reactor slurry S reaches the first edge 20 before it reaches the second edge 25.

The discharge conduit 12 is an enclosed conduit where the first edge 20 and the second edge 25 are attached to one another and form a continuous connection. For example, the discharge conduit 12 can be a pipe with the first edge 20 and the second edge 25 forming a circle. The cross-section of the continuous connection can have varying elevations, i.e., the cross-section of the continuous connection is not required to be smooth. The discharge conduit 12 can have any cross-sectional shape, such as, for example, a circle, an ellipse, an oval, and the like. Other suitable cross-sectional shapes will be apparent to those of skill in the art and are to be considered within the scope of the present invention.

In some embodiments, the first edge 20 of the end section 16 is substantially flush or recessed with the inner wall 32 of the slurry loop reactor 10.

Second edge 25 of the end section 16 extends past at least a portion of the inner wall 32 of the slurry loop reactor 10 into the liquid reactor slurry S. As the liquid reactor slurry S circulates through the slurry loop reactor 10, the liquid reactor slurry S comes in contact with an inner surface 40 of the second edge 25 so that the polymer solids contained within the liquid reactor slurry S are concentrated on the inner surface 40 of the second edge 25. The polymer solids that are concentrated on the inner surface 40 are then discharged through the discharge conduit 12 as part of discharge slurry D. The polymer solids are concentrated on the inner surface 40 of the second edge 25 so that an average polymer solids concentration in the resulting discharge slurry D is greater than an average polymer solids concentration of the liquid reactor slurry S within the slurry loop reactor 10. The liquid reactor slurry that is typically discharged in prior art polymerization processes under similar reaction conditions contains a lower average concentration of polymer solids and a higher average concentration of diluent than the discharge slurry D of the present invention. As a result, a smaller amount of diluent is recycled per pound of polymer solid produced in the processes in accordance with the present invention when compared with traditional slurry loop polymerization processes. Because a smaller amount of diluent is being recycled, less condensing, pumping, and treating requirements are needed in the present invention when compared with prior art processes that recycle more diluent.

As indicated previously, in polypropylene processes, external diluents are not typically added to the process. Unreacted propylene performs a function in polypropylene processes that is similar to the function performed by the diluent in typical polyethylene processes. For purposes of the present invention, the apparatuses and methods described herein can be used in polypropylene processes, with the diluent being the unreacted propylene, in addition to polyethylene processes as described herein.

In some embodiments, the first edge 20 and the second edge 25 have a same thickness. Alternatively, the first edge 20 and the second edge 25 can have different thicknesses.

Second edge 25 can be elongated in comparison to the first edge 20 and inserted into the slurry loop reactor 10 farther than a second edge of a straight-cut pipe that has been cut at a 90 degree angle. More of the inner surface 40 is inserted into the liquid reactor slurry S than with traditionally straight-cut pipe, i.e., traditional continuous take off (CTO). Because more of the inner surface 40 is inserted into the liquid reactor slurry S, a greater amount of solids is concentrated on the inner surface 40 and discharged when compared with prior art processes.

Using the methods and systems described herein, the inventors have calculated that the percentage solids increase in the discharge slurry D over the liquid reactor slurry S in the traditional continuous take off (CTO) would be up to about 6.5% higher than the discharge slurry contained within the traditional CTO, as shown in Table 1. In an aspect, the inventors have calculated that the percentage solids increase in the discharge slurry D over the discharge slurry of the traditional CTO would be from about 1.5% to about 6.5% higher than the discharge slurry contained within the traditional CTO. In an aspect, the inventors have calculated that the percentage solids increase in the discharge slurry D over the discharge slurry of the traditional CTO would be from about 2.2% to about 4.7% higher than the discharge slurry contained within the traditional CTO. Alternatively, from about 3.0% to about 4.7% higher than the discharge slurry contained within the traditional CTO. The solids concentration within a discharge slurry produced using the traditional CTO is greater than or at least equal to the solids concentration of the liquid reactor slurry S contained within the slurry loop reactor 10. Use of embodiments of the present invention result in the production of a discharge slurry D having an even greater average concentration differential with respect to the liquid reactor slurry S than is achieved when using traditional CTO.

TABLE 1

Calculated Increase in Discharge Slurry Solids Concentration

| Efficiency | Extension (%) | Amount Removed | Solids Concentration Increase (%) |
|---|---|---|---|
| 50% | 9.1 | 4.6 | 1.6 |
|  | 13.6 | 6.8 | 2.3 |
|  | 18.2 | 9.1 | 3.1 |
| 75% | 9.1 | 6.8 | 2.3 |
|  | 13.6 | 10.2 | 3.5 |
|  | 18.2 | 13.7 | 4.6 |
| 100% | 9.1 | 9.1 | 3.1 |
|  | 13.6 | 13.6 | 4.6 |
|  | 18.2 | 18.2 | 6.2 |

The weight percent of solids increase, such as those shown in Table 1, can be affected by various factors, such as the location of the discharge conduit 12 on the slurry loop reactor 10, the size and configuration of the discharge conduit 12, the orientation of the end section 16 relative to the direction of the liquid reactor slurry S, and the weight percent of solids in the liquid reactor slurry S. The calculations set forth in Table 1 were performed assuming 46 wt. % reactor solids, a liquid reactor slurry S density of 34 lb/ft$^3$, using a 24" schedule 60 pipe, which corresponds to a 22" ID; and the calculations were performed using pipe extensions into the slurry loop reactor 10 of 2", 3", and 4". It should be apparent to those skilled in the art that it can be possible to obtain even greater solids concentration increases when the operating conditions are modified from those used as the basis for the calculations set forth in Table 1.

To increase production from the slurry loop reactor 10, additional discharge conduits 12 can be placed on-line on the slurry loop reactor 10. In some embodiments, more than one discharge conduit 12 can be installed on the slurry loop reactor 10.

The angle A at which the discharge conduit 12 is attached to the slurry loop reactor 10 can be varied. In some embodiments, the discharge conduit 12 is attached to the slurry loop reactor 10 so that the longitudinal axis 14 and at least a portion of an outer wall 34 of the slurry loop reactor 10 form an angle A of less than about 90 degrees. In some embodiments, the angle A is between about 0 degrees and about 60 degrees. In yet other embodiments, the angle A is between about 30 degrees and about 60 degrees.

In an embodiment, a ram valve 38 can be installed and located on the discharge conduit 12 and oriented at a same angle as the discharge conduit 12. In some embodiments, the ram valve 38 has an extended body. In the event that polymer solids contained within the discharge slurry D become clogged or trapped within the discharge conduit 12, the ram valve 38 can be used to dislodge any such polymer and clear the discharge conduit 12. In cases of severe clogging or trapping, the discharge conduit 12 can become plugged by the polymer solids, in which case the ram valve 38 can be used to unplug the discharge conduit 12. With the ram valve 38, no permanent pluggage will form because the ram valve 38 can always be closed, when needed, thereby displacing any accumulation of polymer solids back into the slurry loop reactor 10 into the flow of the liquid reactor slurry S. The polymer solids will then become part of the liquid reactor slurry S again. Once the polymer solids are returned to the slurry loop reactor 10, the ram valve 38 can be returned to its normally open position. The opening and closing of the ram valve 38 can be controlled manually or automatically.

As another embodiment of the present invention, a process for discharging a discharge slurry D from a slurry loop reactor 10 is provided. In this embodiment, a discharge conduit 12 is opened to provide access to the slurry loop reactor 10. The discharge conduit 12 has a longitudinal axis 14 and an end section 16 for removing the discharge slurry D from the slurry loop reactor 10. The discharge slurry D includes polymer solids from the slurry loop reactor 10. The end section 16 includes a first edge 20 and a second edge 25. Second edge 25 extends past at least a portion of an inner wall 32 of the slurry loop reactor 10 into a liquid reactor slurry S contained within the slurry loop reactor 10. The polymer solids concentrate on an inner surface 40 of the second edge 25 of the end section 16 and are discharged through the discharge conduit 12 as part of the discharge slurry D. The average polymer solids concentration in the discharge slurry D is greater than an average polymer solids concentration in the liquid reactor slurry S.

In an aspect, as shown in FIG. 1, the first edge 20 of the end section 16 is substantially flush or recessed with the inner wall 32 of the slurry loop reactor 10. Because the first edge 20 is recessed or substantially flush with the inner wall 32, the risk of polymer solids becoming trapped around the first edge 20 is essentially eliminated. In some embodiments, the second edge 25 of the end section 16 is downstream of the first edge 20 of the end section 16.

In some embodiments, the discharge conduit 12 is located within a lower leg or bend of the slurry loop reactor 10. Because of centrifugal forces, the highest concentration of polymer solids within the slurry loop reactor 10 typically occurs in the bends within the slurry loop reactor 10. In some embodiments, the discharge conduit 12 can be located within an upper bend that connects vertical legs of the slurry loop reactor 10. The legs or bends that connect the vertical legs of the slurry loop reactor 10 can be 180° bends.

In some embodiments, when the polymer solids are being concentrated on the inner surface 40, the average polymer solids in the discharge slurry D are believed to be up to about 6.5% greater than the average polymer solids concentration of the discharge slurry within the traditional CTO. The estimated range of the increase of polymer solids concentration is based upon calculations performed by the inventors, as previously described, and can be even greater when reaction conditions are adjusted. In some embodiments, the average polymer solids in the discharge slurry D is between about 1.5% to about 6.5% greater than the average polymer solids concentration of the discharge slurry within the traditional CTO. Alternatively, the increase in solids is from about 2.2% to about 4.7% higher; or alternatively, from about 3.0% to about 4.7% higher.

While the invention has been shown or described in only some of its forms, it should be apparent to those skilled in the art that it is not so limited, but is susceptible to various changes without departing from the scope of the invention. For example, various means of attaching the discharge conduit to the slurry loop reactor 10 can be used, such as welding. Other suitable changes will be apparent to those of skill in the art and are to be considered within the scope of the present invention.

We claim:

1. A slurry loop reactor comprising:
   (a) a discharge conduit having a longitudinal axis and an end section for removing a discharge slurry comprising polymer solids, the discharge slurry being withdrawn from a liquid reactor slurry contained within the slurry loop reactor,
   (b) a first edge of the end section of the discharge conduit that is substantially flush or recessed with an inner wall of the slurry loop reactor; and
   (c) a second edge of the end section of the discharge conduit that extends past at least a portion of the inner wall of the slurry loop reactor into the liquid reactor slurry so that the polymer solids are concentrated thereon and an average polymer solids concentration in the discharge slurry is greater than an average polymer solids concentration of the liquid reactor slurry within the slurry loop reactor, wherein the second edge is elongated in relation to the first edge.

2. The slurry loop reactor of claim 1, wherein the discharge conduit is attached to the slurry loop reactor so that the longitudinal axis and at least a portion of an outer wall of the slurry loop reactor form an angle of less than about 90 degrees.

3. The slurry loop reactor of claim 2, wherein the angle is between about 0 degrees and about 60 degrees.

4. The slurry loop reactor of claim 1, wherein the average polymer solids concentration in the discharge slurry is up to about 6.5% greater than an average polymer solids concentration of a traditional continuous take off discharge slurry.

5. The slurry loop reactor of claim 1, wherein the discharge conduit is located within a lower leg of the slurry loop reactor.

6. The slurry loop reactor of claim 1, further comprising a ram valve located on the discharge conduit and oriented at a same angle as the discharge conduit.

7. The slurry loop reactor of claim 1, wherein the discharge conduit is configured to continuously withdraw the discharge slurry from the liquid reactor slurry contained within the slurry loop reactor.

8. A slurry loop reactor comprising:
   (a) a continuous discharge conduit having a longitudinal axis and an end section for removing a discharge slurry comprising polymer solids from the slurry loop reactor, the discharge conduit being attached to the slurry loop reactor so that the longitudinal axis and at least a portion of an outer wall of the slurry loop reactor form an angle of less than about 90 degrees;
   (b) a first edge of the end section of the discharge conduit and
   (c) a second edge of the end section that extends past at least a portion of an inner wall of the slurry loop reactor into a liquid reactor slurry within the slurry loop reactor so that polymer solids contained within the liquid reactor slurry are concentrated thereon and an average polymer solids concentration in the discharge slurry is greater than an avenge polymer solids concentration of the liquid reactor slurry within the slurry loop reactor, wherein the second edge is elongated in relation to the first edge.

9. The slurry loop reactor of claim 8, wherein the first edge of the end section is substantially flush or recessed with the inner wall of the slurry loop reactor.

10. The slurry loop reactor of claim 8, wherein the angle is between about 0 degrees and about 60 degrees.

11. The slurry loop reactor of claim 8, further comprising a ram valve located on the discharge conduit and oriented at a same angle as the discharge conduit.

12. The slurry loop reactor of claim 8, wherein the avenge polymer solids concentration in the discharge slurry is up to about 6.5% greater than an average polymer solids concentration of a traditional continuous take off discharge slurry.

13. A process for discharging a discharge slurry from a slurry loop reactor comprising the steps of:
(a) opening a discharge conduit to the slurry loop reactor, the discharge conduit having a longitudinal axis and an end section for removing the discharge slurry comprising polymer solids from the slurry loop reactor, the end section comprising a first edge and a second edge that extends past at least a portion of an inner wall of the slurry loop reactor into a liquid reactor slurry contained within the slurry loop reactor, wherein the second edge is elongated in relation to the first edge:
(b) concentrating the polymer solids on the second edge of the end section so that an average polymer solids concentration in the discharge slurry is greater than an avenge polymer solids concentration in the liquid reactor slurry; and
(c) discharging the concentrated polymer solids through the discharge conduit as part of the discharge slurry so that an average polymer solids concentration in the discharge slurry is greater than an average polymer solids concentration in the liquid reactor slurry.

14. The process of claim 13, wherein the first edge of the end section is substantially flush or recessed with the inner wall of the slurry loop reactor.

15. The process of claim 13, wherein the discharge conduit is attached to the slurry loop reactor so that the longitudinal axis and at least a portion of an outer wall of the slurry loop reactor form an angle of less than about 90 degrees.

16. The process of claim 15, wherein the angle is between about 0 degrees and about 60 degrees.

17. The process of claim 13, further comprising attaching a ram valve on the discharge conduit at a same angle as the discharge conduit is attached to the slurry loop reactor.

18. The process of claim 17, further comprising removing accumulated polymer solids from within the discharge conduit by closing the ram valve.

19. The process of claim 13, wherein the average polymer solids concentration in the discharge slurry is up to about 6.5% greater than an average polymer solids concentration of a traditional continuous take off discharge slurry.

* * * * *